United States Patent
Kim et al.

(10) Patent No.: US 10,344,713 B2
(45) Date of Patent: Jul. 9, 2019

(54) LPG BOMBE COOLING SYSTEM OF BI-FUEL VEHICLE

(71) Applicant: HYUNDAI MOTOR COMPANY, Seoul (KR)

(72) Inventors: Chang Han Kim, Gwangju (KR); Jae Min Lee, Gongju-si (KR); Keun Soo Kim, Yongin-si (KR); Jin Su Jeong, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 364 days.

(21) Appl. No.: 15/392,560

(22) Filed: Dec. 28, 2016

(65) Prior Publication Data

US 2018/0017021 A1   Jan. 18, 2018

(30) Foreign Application Priority Data

Jul. 13, 2016   (KR) .................. 10-2016-0088327

(51) Int. Cl.
| | |
|---|---|
| F02M 21/02 | (2006.01) |
| F02D 19/06 | (2006.01) |
| F02D 19/08 | (2006.01) |
| F17C 13/00 | (2006.01) |

(52) U.S. Cl.
CPC ..... F02M 21/0221 (2013.01); F02D 19/0647 (2013.01); F02D 19/081 (2013.01); F02M 21/0212 (2013.01); F02M 21/0242 (2013.01); F17C 13/00 (2013.01); Y02T 10/32 (2013.01); Y02T 10/36 (2013.01)

(58) Field of Classification Search
CPC ............ F02D 19/0665; F02D 19/0647; F02M 37/0088; F02M 37/0064; F02M 53/02; F02M 31/20; F01P 2003/005
See application file for complete search history.

(56) References Cited

U.S. PATENT DOCUMENTS

| | | | | |
|---|---|---|---|---|
| 2,795,937 | A * | 6/1957 | Sattler .................. | F17C 9/04 114/269 |
| 5,542,398 | A * | 8/1996 | Marcon .............. | F02M 21/0212 123/527 |
| 2008/0302110 | A1 | 12/2008 | Handa | |
| 2012/0189462 | A1* | 7/2012 | Hurley .................. | F17C 5/02 417/1 |

(Continued)

FOREIGN PATENT DOCUMENTS

| | | |
|---|---|---|
| JP | 2010-522309 A | 7/2010 |
| JP | 2011-52668 A | 3/2011 |

(Continued)

*Primary Examiner* — Long T Tran
(74) *Attorney, Agent, or Firm* — Knobbe Martens Olson & Bear LLP (57) ABSTRACT

An LPG bombe cooling system of a bi-fuel vehicle using both gasoline and LPG is provided. The LPG bombe cooling system is configured to cool the interior of an LPG bombe and to reduce the vapor pressure of LPG by supplying some gasoline from a gasoline tank into the LPG bombe using the fact that the temperature of gasoline in the gasoline tank is lower than the temperature of LPG in the LPG bombe, whereby it is possible to easily refill the LPG bombe with LPG even in the case in which the external temperature is very high, e.g. in the hot season.

11 Claims, 10 Drawing Sheets

(56) References Cited

U.S. PATENT DOCUMENTS

2014/0245995 A1* 9/2014 Deliyski ................ F02M 69/50
  123/456
2015/0068495 A1* 3/2015 Pursifull ................ F02M 41/00
  123/456

FOREIGN PATENT DOCUMENTS

| KR | 10-2012-0090212 A | 8/2012 |
| KR | 10-2013-0065026 A | 6/2013 |
| KR | 10-1639305 B1 | 7/2016 |

* cited by examiner

LPG BOMBE COOLING SYSTEM OF BI-FUEL VEHICLE

CROSS-REFERENCE TO RELATED APPLICATION

This application claims under 35 U.S.C. §119(a) the benefit of priority to Korean Patent Application No. 10-2016-0088327 filed on Jul. 13, 2016, the entire contents of which are incorporated herein by reference.

BACKGROUND

(a) Field

The present disclosure relates to an LPG bombe cooling system of a bi-fuel vehicle.

(b) Background Art

A bi-fuel vehicle using both gasoline and LPG is equipped with a gasoline supply system and an LPG supply system, which are separately provided.

Figure 1:
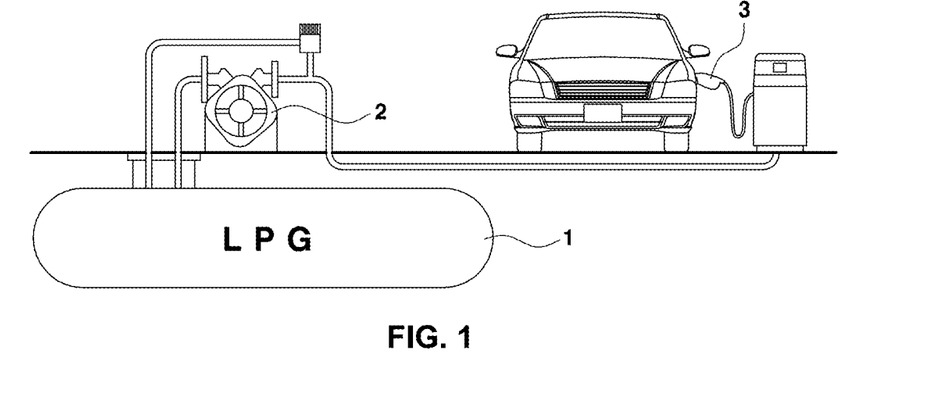
FIG. 1 is a view schematically showing an LPG filling process of a bi-fuel vehicle.

As shown in FIG. 1, a process of filling the LPG bombe of the bi-fuel vehicle with LPG includes a step of operating a filling pump 2 of an LPG filling station, a step of supplying LPG from an LPG storage space 1 of the LPG filling station to a filling gun 3 as the result of operating the filling pump 2, and a step of filling the LPG bombe of the vehicle with LPG using an LPG filling pressure of the filling gun 3.

The disclosure of this section is to provide background of the invention. Applicant notes that this section may contain information available before this application. However, by providing this section, Applicant does not admit that any information contained in this section constitutes prior art.

SUMMARY

One aspect of the present invention provides an LPG bombe cooling system of a bi-fuel vehicle using both gasoline and LPG, which is capable of cooling the interior of an LPG bombe and reducing the vapor pressure of LPG by supplying some gasoline from a gasoline tank into the LPG bombe using the fact that the temperature of gasoline in the gasoline tank is lower than the temperature of LPG in the LPG bombe, whereby it is possible to easily refill the LPG bombe with LPG even in the case in which the external temperature is very high, e.g. in the hot season.

Another aspect of the present invention provides an LPG bombe cooling system of a bi-fuel vehicle including an auxiliary chamber mounted in an LPG bombe of the bi-fuel vehicle, a first fuel branch line diverging from a gasoline supply line connected between a gasoline tank and an engine and connected to the auxiliary chamber, a second fuel branch line diverging from an LPG supply line connected between an LPI pump mounted in the LPG bombe and the engine and connected to the auxiliary chamber, a first solenoid valve mounted in the first fuel branch line, a second solenoid valve mounted in the second fuel branch line, and a controller for performing control such that the first solenoid valve and the second solenoid valve are opened or closed based on a pressure in the LPG bombe.

In an embodiment, the auxiliary chamber may include a flange portion seated on a mounting hole formed in the LPG bombe, a heat exchange chamber extending from the flange portion into the LPG bombe, and a sealing cover attached to the mounting hole in the LPG bombe on which the flange portion is seated.

In another embodiment, the heat exchange chamber may be provided, at a distal end portion thereof, with a check valve for allowing LPG to flow from the heat exchange chamber into the LPG bombe.

In still another embodiment, the auxiliary chamber may be made of an aluminum material having a high heat transfer rate.

In yet another embodiment, the auxiliary chamber may be provided, at an inlet thereof, with a jet nozzle for spraying gasoline into the heat exchange chamber.

In still yet another embodiment, the first fuel branch line may be provided, at a point thereof between the first solenoid valve and the auxiliary chamber, with a flow meter for measuring an amount of gasoline supplied to the auxiliary chamber.

In a further embodiment, the LPG bombe may have therein a partition wall for partitioning an interior of the LPG bombe into a space in which the auxiliary chamber is disposed and a space in which the LPI pump is disposed and for preventing gasoline from being directly supplied to the LPI pump.

In another further embodiment, the controller may control an amount of time for which the first solenoid valve is open based on a remaining LPG amount measurement signal from an LPG gauge mounted in the LPG bombe in order to determine an amount of gasoline that is supplied to the auxiliary chamber.

In still another further embodiment, when the LPI pump is operated in a state in which the first solenoid valve is closed, the controller may perform control such that the second solenoid valve is open for a predetermined time period, whereby a portion of LPG supplied from the LPG bombe to the engine is supplied to the auxiliary chamber, and at this time the controller may perform control such that the LPI pump is operated at a maximum operating level for a predetermined time period.

In yet another further embodiment, the pressure in the LPG bombe may be measured using a pressure sensor in a regulator mounted in an LPG supply line and an LPG return line.

A further aspect of the invention provides a bi-fuel vehicle comprising: a bi-fuel engine configured to run on two or more fuels which comprises gasoline and LPG (liquefied propane gas or liquefied petroleum gas); a gasoline tank containing gasoline and connected to the engine via a gasoline supply line; an LPG tank containing LPG and connected to the engine via an LPG supply line; a heat exchanger disposed in the LPG tank, the heat exchanger comprising a container which is connected to the gasoline tank via a gasoline branch line which is branched from the gasoline supply line and is further connected to the LPG tank via an LPG branch line which is branched from the LPG supply line, the heat exchanger comprising a check valve; a gasoline valve disposed on the gasoline branch line and configured to control the flow of the gasoline toward the container of the heat exchanger; an LPG valve disposed on the LPG branch line and configured to control the flow of the LPG toward the container of the heat exchanger; and a controller comprising one or more processors and configured to control the gasoline and LPG valves based on the pressure of the LPG tank such that part of the gasoline is transmitted to the container while supplying the gasoline to the engine for combustion, subsequently, either gasoline or LPG is not transmitted to the container for a time period for letting the gasoline in the container to heat-exchange with the LPG contained in the LPG tank; and subsequently, when the LPG is supplied to the engine for combustion, part of the LPG is transmitted to the container in which the part of the LPG is mixed with the gasoline contained in the container, thereby increasing a pressure in the container and causing the mixture of the gasoline and the LPG to be released to the LPG tank through the check valve. Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with embodiments, it will be understood that the present description is not intended to limit the invention to those embodiments. On the contrary, the invention is intended to cover not only the embodiments, but also various alternatives, modifications, equivalents and other embodiments, which may be included within the spirit and scope of the invention as defined by the appended claims.

A bi-fuel vehicle using both gasoline and LPG is equipped with a gasoline supply system and an LPG supply system, which are separately provided.

In a fuel supply system of the bi-fuel vehicle, in the case where the external temperature is very high, e.g. in the hot season, the pressure in the LPG bombe of the vehicle may be higher than the LPG filling pressure, with the result that LPG filling is not possible.

In the case in which the pressure in the LPG bombe of the vehicle is higher than the LPG filling pressure, a check valve of an excess flow valve mounted in an LPG injection port of the LPG bombe is not opened, with the result that it is not possible to fill the LPG bombe with LPG through the filling gun.

For example, when the atmospheric temperature in the hot season is about 40° C. or higher, the pressure in the LPG bombe of the vehicle becomes higher (e.g. 16.5 bar) than the LPG filling pressure in the filling gun (e.g. 16.3 bar=the pressure in the LPG storage space of the LPG filling station 8.3 bar+the LPG pumping pressure as the result of operating the filling pump 8.0 bar). Consequently, the check valve of the excess flow valve mounted in the LPG injection port of the LPG bombe is not opened, with the result that it may be impossible to fill the LPG bombe with LPG through the filling gun.

Figure 2:
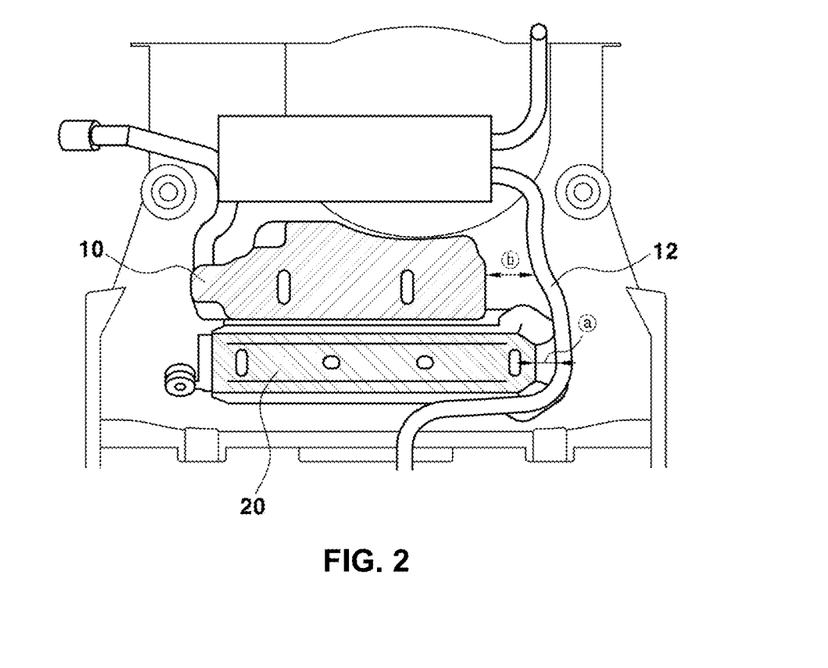
FIG. 2 is a view schematically showing the state in which a gasoline tank and an LPG bombe are disposed in a bi-fuel vehicle.

Referring to FIG. 2, in embodiments, a gasoline tank 10 and an LPG bombe or LPG tank 20 are mounted to the chassis of the bi-fuel vehicle so as to be parallel to each other. In the layout of the bi-fuel vehicle, the distance ⓐ between the LPG bombe 20 and an exhaust gas discharge line 12 is shorter than the distance ⓑ between the gasoline tank 10 and the exhaust gas discharge line 12. As a result, the gasoline tank 10 is less affected by a heat source than the LPG bombe 20.

Consequently, the temperature of gasoline in the gasoline tank 10 is maintained lower than the temperature of LPG in the LPG bombe (which can also be referred as LPG container or LPG tank) 20.

In addition, the gasoline supplied from the gasoline tank to an engine is burned without returning to the gasoline tank, whereas the unburned portion of the LPG supplied from the LPG bombe to the engine is returned to the LPG bombe.

Since the LPG is returned from the engine to the LPG bombe in the state in which the temperature of the LPG is increased by the heat of combustion in the engine, the temperature in the LPG bombe is increased.

As a result, the temperature in the LPG bombe becomes higher than the temperature in the gasoline tank. Further-more, in the case in which the external temperature is very high, e.g. in the hot season, the temperature in the LPG bombe is further increased, and at the same time the pressure in the LPG bombe is also increased. If the pressure in the LPG bombe becomes higher than the LPG filling pressure, it becomes impossible to refill the LPG.

In consideration that the temperature of gasoline in the gasoline tank is lower than the temperature of LPG in the LPG bombe, to reduce the pressure in the LPG tank, some of the gasoline in the gasoline tank is supplied into the LPG bombe to cool the interior of the LPG bombe and to reduce the vapor pressure of LPG using the supplied gasoline.

Hereinafter, the construction of an LPG bombe cooling system of a bi-fuel vehicle according to embodiments of the present invention will be described.

Figure 3:
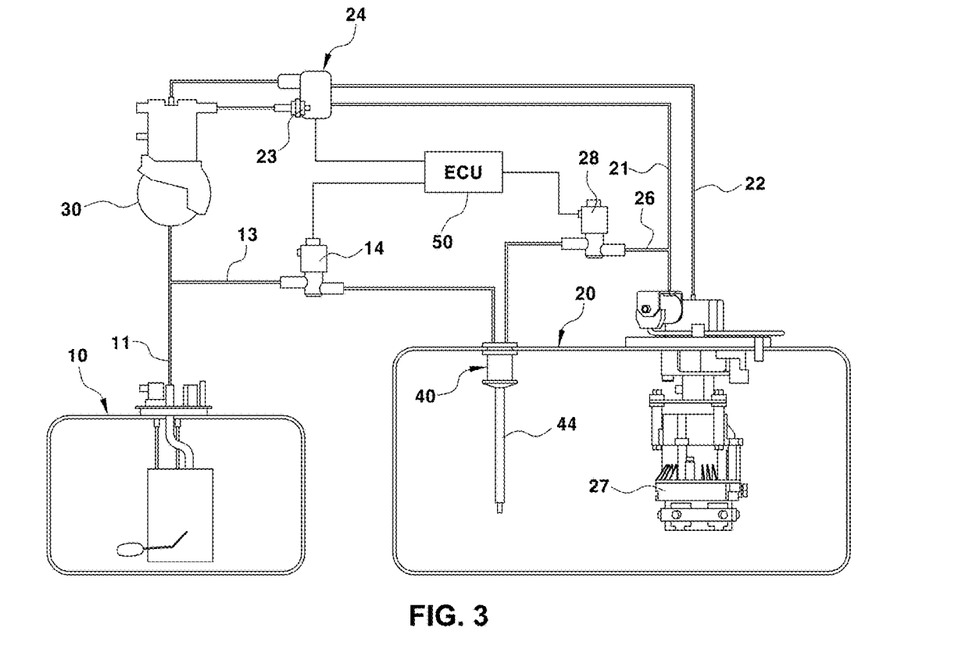
FIG. 3 is a view showing the construction of an LPG bombe cooling system of a bi-fuel vehicle according to embodiments of the present invention.

FIG. 3 is a view showing the construction of an LPG bombe cooling system of a bi-fuel vehicle according to embodiments of the present invention. In FIG. 3, reference numeral 10 indicates a gasoline tank for storing gasoline, and reference numeral 20 indicates an LPG bombe for storing LPG.

The gasoline tank 10 and the LPG bombe 20 are connected to a single engine 30 so as to supply gasoline and LPG to the engine 30, respectively.

Specifically, the gasoline tank 10 is connected to the engine 30 via a gasoline supply line 11, and the LPG bombe 20 is connected to the engine 30 via an LPG supply line 21.

The LPG bombe 20 is also connected to the engine 30 via an LPG return line 22. A regulator 24 having a pressure sensor 23 is mounted in the LPG supply line 21 and the LPG return line 22.

When LPG from the LPG bombe 20 is supplied to the engine 30 via the LPG supply line 21 and unburned LPG is returned to the LPG bombe 20 via the LPG return line 22, the regulator 24 controls a flow rate of LPG and senses the pressure of LPG.

Specifically, when LPG from the LPG bombe or LPG tank 20 is supplied to the engine 30 via the LPG supply line 21, the pressure sensor 23, which is included in the regulator 24, senses the pressure of LPG passing through the regulator 24, and the sensed pressure is transmitted to a controller (ECU) 50 as a signal indicating the pressure in the LPG bombe 20.

According to embodiments of the present invention, the LPG bombe 20 is provided with an auxiliary chamber 40 for storing gasoline from the gasoline tank 10. Gasoline in the auxiliary chamber 40 heat-exchanges with the inner space of the LPG bombe and with LPG in the LPG bombe to cool the LPG bombe and LPG in the LPG bombe.

Figure 4:
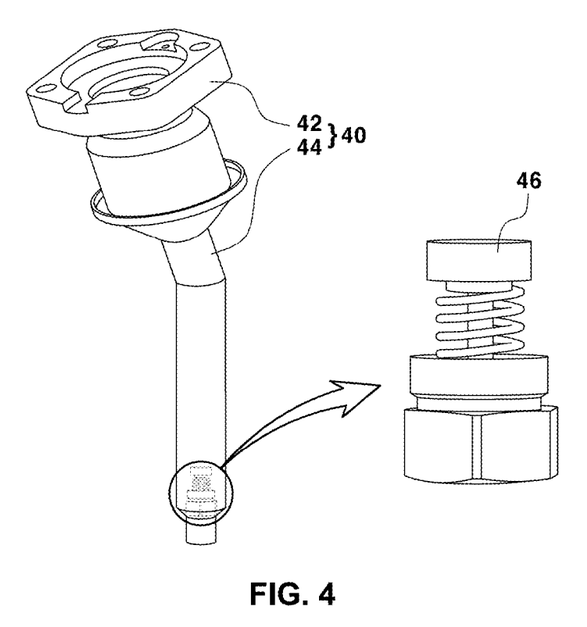
FIG. 4 is a perspective view showing an auxiliary chamber of the LPG bombe cooling system according to embodiments of the present invention.
Figure 5:
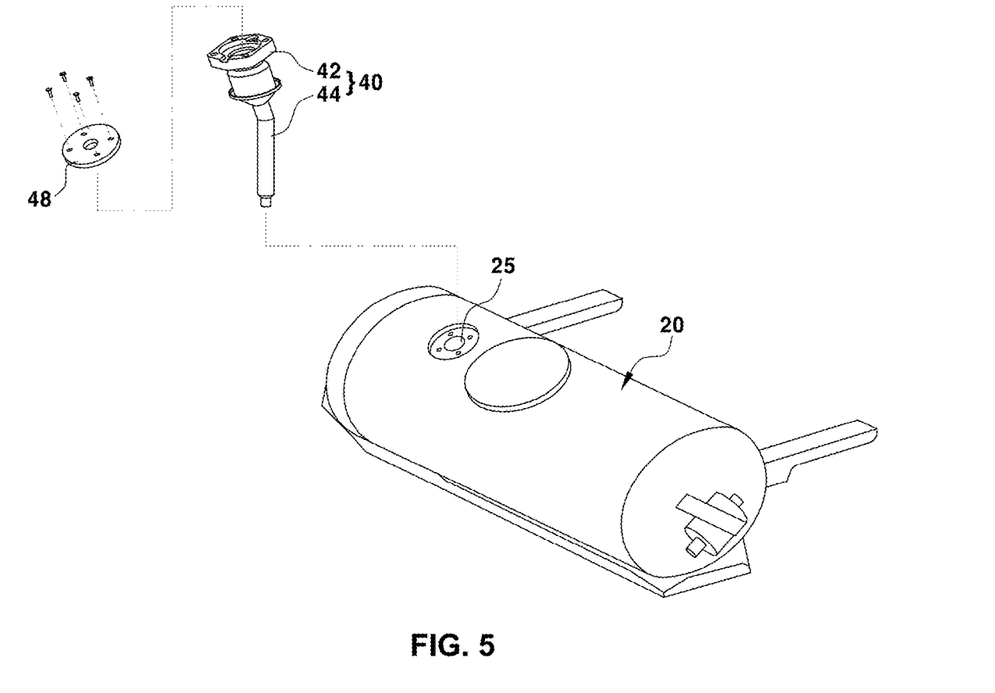
FIG. 5 is a perspective view showing the state in which the auxiliary chamber of the LPG bombe cooling system according to embodiments of the present invention is mounted in an LPG bombe.

Referring to FIGS. 4 and 5, the auxiliary chamber 40 includes a flange portion 42, which is seated on a mounting hole 25 formed in the LPG bombe 20 in a stepped manner, and a heat exchange chamber 44, which extends from the flange portion 42 into the LPG bombe 20. The auxiliary chamber 40 may be preferably made of an aluminum material having a high heat transfer rate.

More preferably, in order to secure sufficient heat exchange area suitable for the internal volume of the LPG bombe 20, the heat exchange chamber 44 may be formed in various shapes, e.g. a straight tube, a zigzag tube, or the like.

In addition, a check valve 46 is mounted to a distal end portion of the heat exchange chamber 44 of the auxiliary chamber 40 in order to allow LPG to flow from the heat exchange chamber 44 only into the LPG bombe 20.

When the auxiliary chamber 40 is mounted in the LPG bombe 20, the heat exchange chamber 44 is inserted into the LPG bombe 20 through the mounting hole 25 in the LPG bombe 20 such that the flange portion 42 is seated on the outer periphery of the mounting hole 25, a sealing cover 48 is brought into close contact with the flange portion 42, and bolts are fastened from the sealing cover 48 to the LPG bombe 20 via the flange portion 42.

A first fuel branch line 13, which diverges from the gasoline supply line 11, passes through the sealing cover 48, and the distal end portion of the first fuel branch line 13 is communicably connected to the auxiliary chamber 40.

Specifically, the first fuel branch line 13, which diverges from the gasoline supply line 11 connected between the gasoline tank 10 and the engine 30, passes through the sealing cover 48 and is communicably connected to the auxiliary chamber 40.

The first fuel branch line 13 is provided with a first solenoid valve 14, which is opened or closed in response to a control signal from the controller 50, so as to allow or interrupt the flow of gasoline from the gasoline tank 10 into the auxiliary chamber 40.

In addition, a second fuel branch line 26 diverges from the LPG supply line 21 connected between an LPI pump 27 mounted in the LPG bombe 20 and the engine 30, and is also communicably connected to the auxiliary chamber 40.

The second fuel branch line 26 is also provided with a second solenoid valve 28, which is opened or closed in response to a control signal from the controller 50, so as to allow or interrupt the flow of some of the LPG from the LPG bombe 20 into the auxiliary chamber 40.

Figure 6:
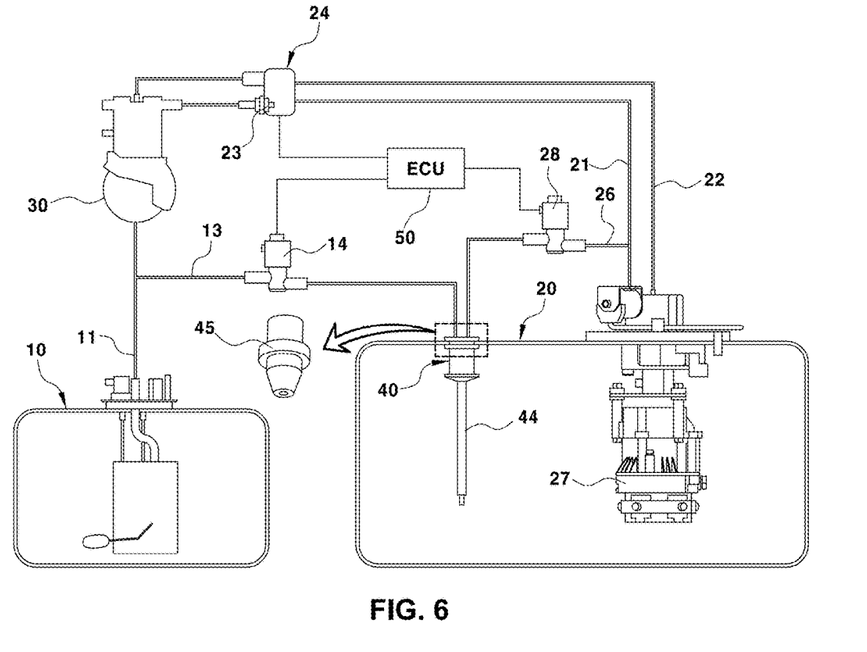
FIG. 6 is a view showing the construction of the LPG bombe cooling system according to embodiments of the present invention in which a jet nozzle is mounted to an inlet of the auxiliary chamber.

As shown in FIG. 6, a jet nozzle 45, which is a kind of a jet pump capable of spraying a fixed amount of gasoline from the first fuel branch line 26 into the heat exchange chamber 44 in a short amount of time, is mounted to an inlet of the auxiliary chamber 40.

Figure 7:
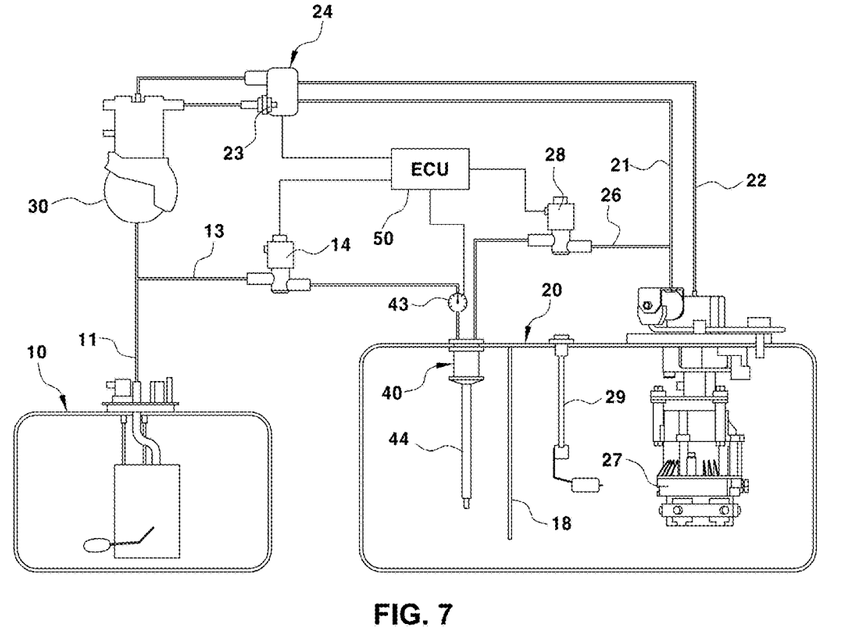
FIG. 7 is a view showing the construction of the LPG bombe cooling system according to embodiments of the present invention in which a flow meter is mounted to the inlet of the auxiliary chamber and a partition wall is mounted in the LPG bombe.

As shown in FIG. 7, a flow meter 43 for measuring the amount of gasoline that is supplied to the auxiliary chamber 40 and transmitting the measurement result to the controller 50 is further mounted in the first fuel branch line 13 connected between the first solenoid valve 14 and the auxiliary chamber 40.

An LPG gauge 29 for measuring the amount of LPG remaining in the LPG bombe 20 is mounted in the LPG bombe 20, and the remaining amount of LPG measured by the LPG gauge 29 is transmitted to the controller 50 as a signal indicating the remaining amount of LPG.

Upon determining that the pressure in the LPG bombe 20, which is received from the pressure sensor 23, is equal to or higher than a reference pressure, the controller 50 performs control such that the first solenoid valve 14 is opened. In addition, the controller 50 controls the amount of time for which the first solenoid valve 14 is open based on the amount of LPG remaining in the LPG bombe 20, which is received from the LPG gauge 29 as a signal.

Gasoline from the gasoline tank 10 passes through the first solenoid valve 14, is supplied to the heat exchange chamber 44 of the auxiliary chamber 40, and exchanges heat with the inner space of the LPG bombe and with LPG in the LPG bombe. Consequently, the interior of the LPG bombe is cooled. As a result, the temperature in the LPG bombe is lowered, and the vapor pressure of LPG is also lowered.

The pressure in the LPG bombe 20 becomes lower than the reference value as the result of the interior of the LPG bombe 20 being cooled and the vapor pressure of LPG being lowered. Consequently, it is possible to easily refill the LPG bombe 20 with LPG.

Meanwhile, when the LPI pump 27 is operated in the state in which the first solenoid valve 14 is closed, the controller 50 performs control such that the second solenoid valve 28 is opened for a predetermined time period, whereby some of the LPG supplied from the LPG bombe 20 to the engine 30 is supplied to the heat exchange chamber 44 of the auxiliary chamber 40 and is mixed with gasoline.

At this time, the controller 50 performs control such that the LPI pump 27 is operated at the maximum operating level for a predetermined time period so that LPG is mixed with gasoline rapidly.

Consequently, LPG is easily mixed with gasoline in the heat exchange chamber 44 of the auxiliary chamber 40, and the pressure in the auxiliary chamber 40 is increased by pressurization force of the LPI pump, which performs pumping at the maximum operating level. The check valve 46 mounted to the lower end of the heat exchange chamber 44 is opened, and gasoline and LPG in the heat exchange chamber 44 are all discharged into the LPG bombe 20.

Therefore, the heat exchange chamber 44 of the auxiliary chamber 40 becomes empty. In the state in which the pressure in the LPG bombe does not fall below the reference pressure, the above-described process of filling the auxiliary chamber 40 with gasoline may be repeatedly performed in order to cool the interior of the LPG bombe.

When gasoline is mixed with LPG, gasoline reduces the vapor pressure of LPG since the temperature of gasoline is lower than the temperature of LPG.

Gasoline and LPG are compounds including C and H (gasoline and LPG are different from each other only in terms of the number of C and H atoms). When gasoline is mixed with LPG, therefore, the mixture is burned without any problem. In order to comply with relevant regulations, however, the controller 50 may control the amount of time for which the first solenoid value is open such that the amount of gasoline supplied into the auxiliary chamber is less than 10% the amount of LPG.

As shown in FIG. 7, a partition wall 18 is mounted in the LPG bombe 20 to partition the interior of the LPG bombe 20 into a space in which the auxiliary chamber is disposed and a space in which the LPI pump is disposed. The partition wall 18 prevents gasoline from being directly supplied to the LPI pump.

Hereinafter, the operation of the LPG bombe cooling system according to embodiments of the present invention with the above-stated construction will be described.

Figure 8:
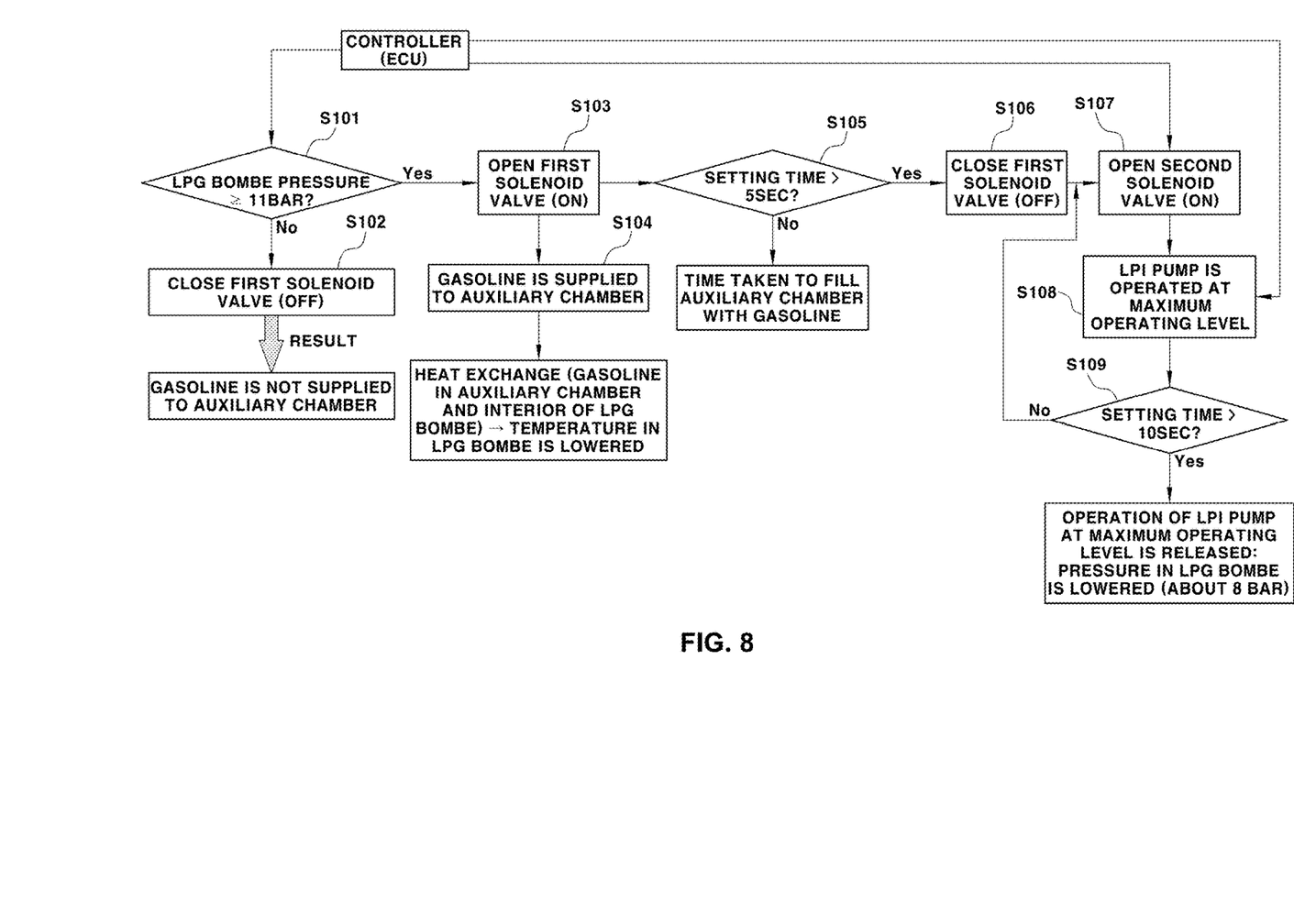
FIG. 8 is a flowchart showing the operation of the LPG bombe cooling system according to embodiments of the present invention.
Figure 9:
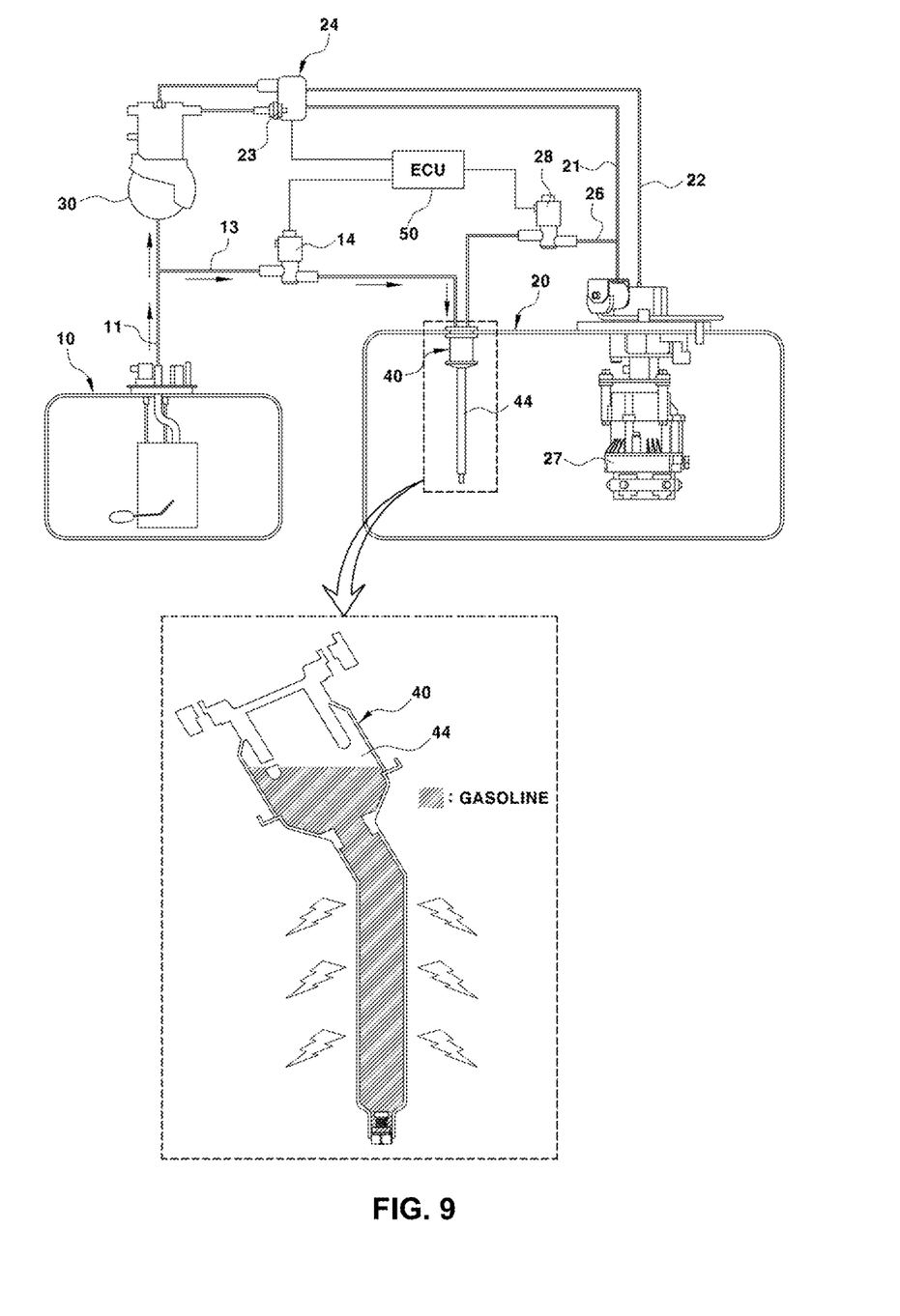
FIGS. 9 to 11 are views showing the operation of the LPG bombe cooling system according to embodiments of the present invention.
Figure 10:
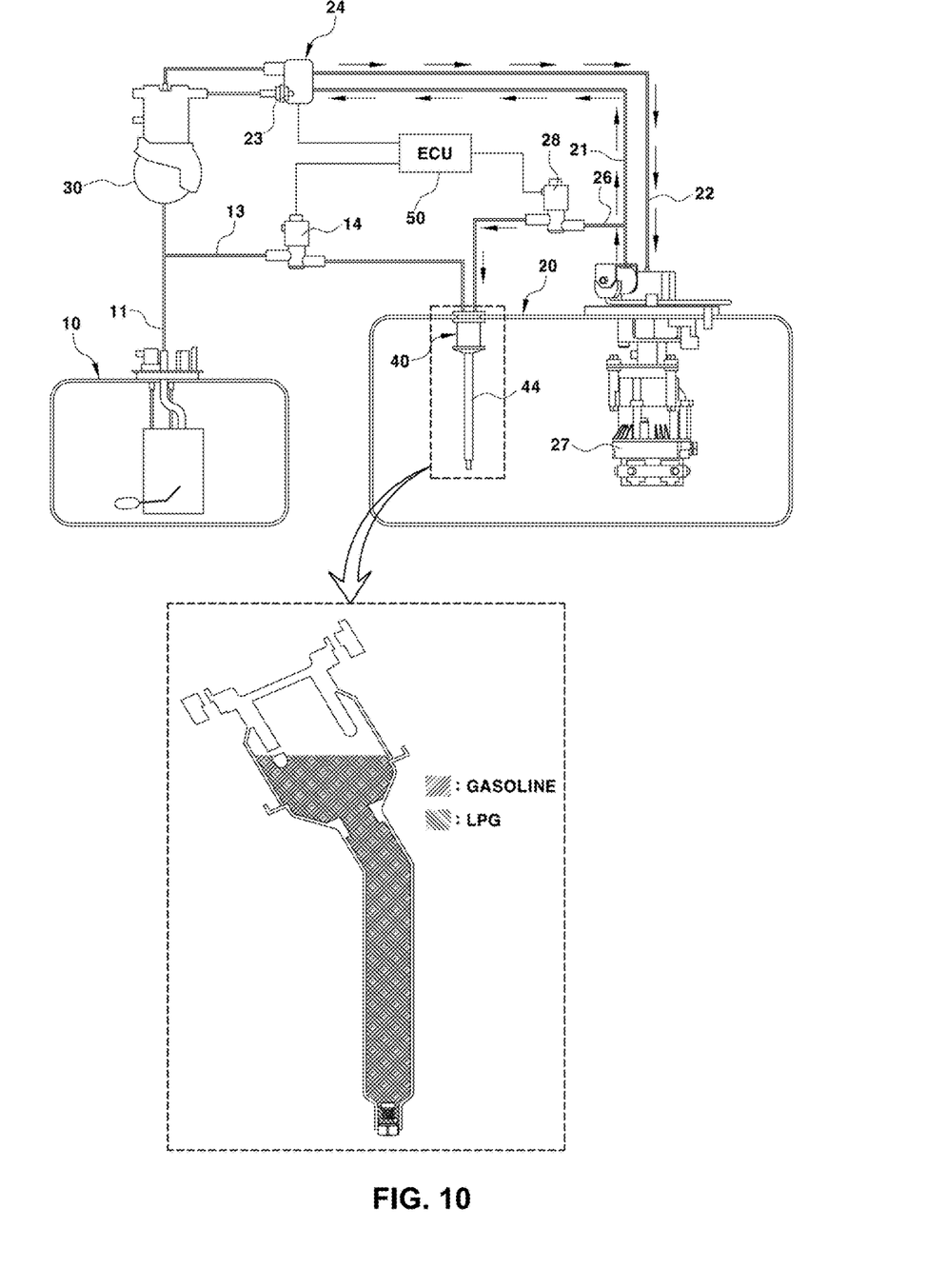
Figure 11:
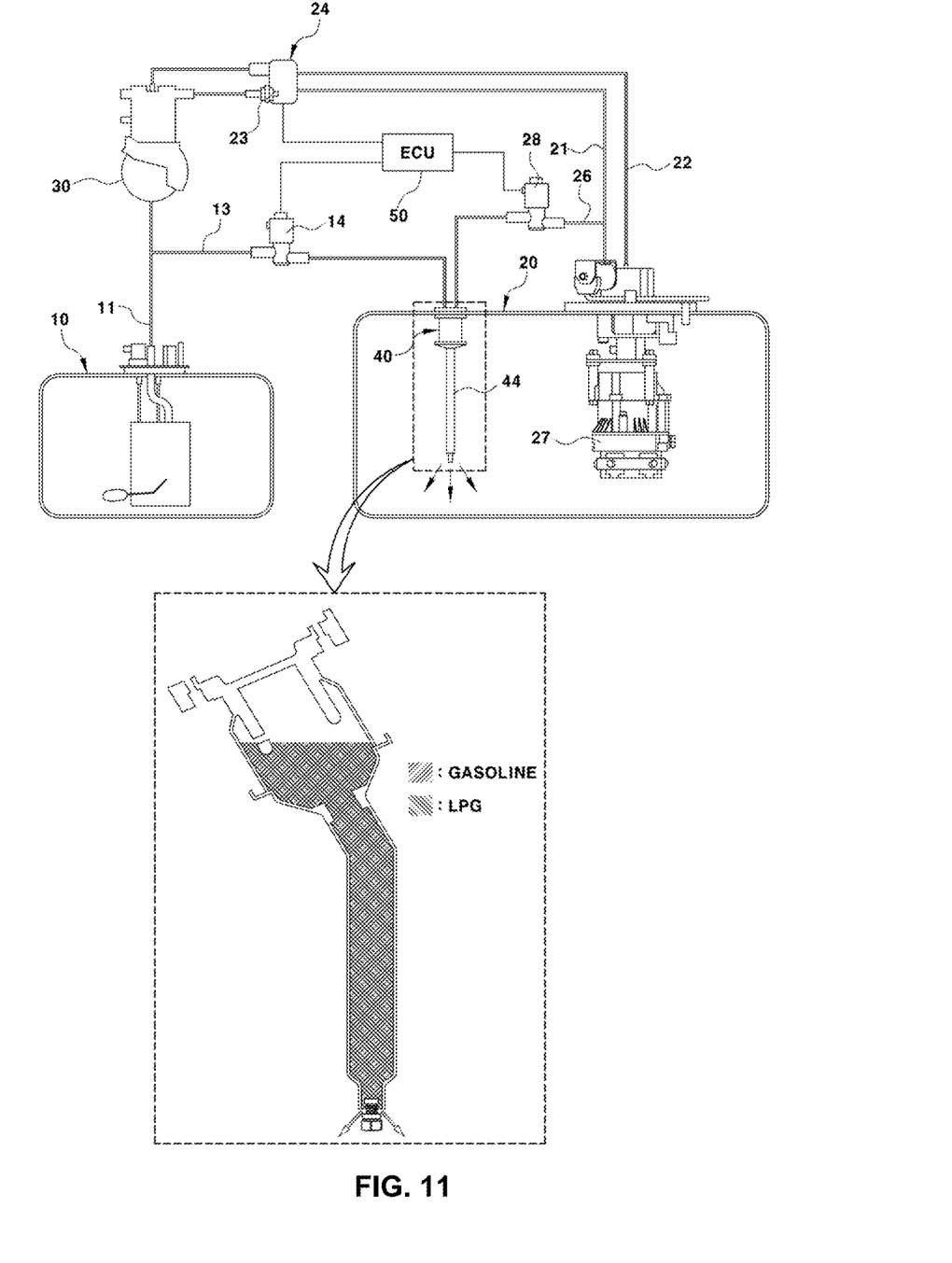

FIG. 8 is a flowchart showing the operation of the LPG bombe cooling system according to embodiments of the present invention, and FIGS. 9 to 11 are views showing the operation of the LPG bombe cooling system according to embodiments of the present invention.

First, the pressure in the LPG bombe 20 is sensed.

Specifically, the pressure in the LPG bombe 20 is sensed using the pressure sensor 23, and the sensed pressure is transmitted to the controller 50 as a signal.

Subsequently, the controller 50 compares the pressure in the LPG bombe 20 with the upper reference value (e.g. 11 bar) (S101).

When the pressure in the LPG bombe 20 is lower than the upper reference value (e.g. 11 bar), the controller 50 performs control such that the first solenoid valve 14 is closed (S102).

As the result of the first solenoid valve 14 being closed, gasoline in the gasoline tank 10 is supplied only to the engine. In embodiments, gasoline in the gasoline tank 10 is not supplied to the auxiliary chamber 40 mounted in the LPG bombe 20.

When the pressure in the LPG bombe 20 is higher than the upper reference value (e.g. 11 bar), the controller 50 performs control such that the first solenoid valve 14 is opened (S103).

Therefore, as shown in FIG. 9, gasoline from the gasoline tank 10 is supplied to the engine, and at the same time some gasoline passes through the first solenoid valve 14 and is supplied to the heat exchange chamber 44 of the auxiliary chamber 40 (S104).

Gasoline in the heat exchange chamber 44 of the auxiliary chamber 40 exchanges heat with the inner space of the LPG bombe and with LPG in the LPG bombe. Consequently, the interior of the LPG bombe is cooled. As a result, the temperature in the LPG bombe and the temperature of LPG are lowered, and the vapor pressure of LPG is also lowered.

The pressure in the LPG bombe 20 becomes lower than the reference value (e.g. 11 bar) as the result of the interior of the LPG bombe 20 being cooled and the vapor pressure of LPG being lowered. Consequently, it is possible to easily refill the LPG bombe 20 with LPG.

At this time, the controller 50 compares the amount of time for which the first solenoid valve 14 is open with a reference time (e.g. the time for which gasoline is supplied into the heat exchange chamber of the auxiliary chamber, about 5 seconds) (S105). Upon determining that the amount of time for which the first solenoid valve 14 is open exceeds the reference time, the controller 50 immediately performs control such that the first solenoid valve 14 is closed (S106).

After the step S106, when LPG in the LPG bombe 20 is supplied to the engine 30 by the operation of the LPI pump 27, the controller 50 performs control such that the second solenoid valve 28 is opened (S107).

Therefore, as shown in FIG. 10, some of the LPG supplied from the LPG bombe 20 to the engine 30 is supplied to the heat exchange chamber 44 of the auxiliary chamber 40 and is mixed with gasoline.

If LPG supplied to the heat exchange chamber 44 of the auxiliary chamber 40 is mixed with gasoline, the vapor pressure of LPG is further reduced by heat exchange with gasoline since the temperature of gasoline is lower than the temperature of LPG. In addition, the temperature in the LPG bombe and the temperature of LPG are further lowered, whereby it becomes possible to easily refill the LPG bombe 20 with LPG.

At this time, in order to quickly supply LPG to the heat exchange chamber 44 to be mixed with gasoline, the controller 50 performs control such that the LPI pump 27 pumps LPG at the maximum operating level (S108).

Subsequently, the controller 50 compares the amount of time for which the LPI pump 27 is operated at the maximum operating level with a reference time (e.g. 10 seconds) (S109). Upon determining that the amount of time for which the LPI pump 27 is operated at the maximum operating level exceeds the reference time, the controller 50 performs control such that the operation of the LPI pump 27 at the maximum operating level is released. This is because the pressure in the LPG bombe has fallen to a value (e.g. 8~10 bar) lower than the reference pressure.

The pressure generated by the operation of the LPI pump 27 at the maximum operation level is applied to the heat exchange chamber 44 of the auxiliary chamber 40, in which LPG and gasoline are mixed. Accordingly, the pressure in the heat exchange chamber 44 is increased higher than the pressure in the LPG bombe 20. As a result, the check valve 46 mounted to the lower end of the heat exchange chamber 44 is opened.

Therefore, as shown in FIG. 11, both gasoline and LPG in the heat exchange chamber 44 of the auxiliary chamber 40 are all discharged into the LPG bombe 20 via the opened check valve 46, and the heat exchange chamber 44 of the auxiliary chamber 40 becomes empty.

In the state in which the pressure in the LPG bombe 20 does not fall below the reference pressure, the above-described process of filling the auxiliary chamber 40 with gasoline may be repeatedly performed in order to cool the interior of the LPG bombe.

As described above, in the case in which the external temperature is very high, e.g. in the hot season, the interior of the LPG bombe is cooled and the vapor pressure of LPG is lowered using gasoline, the temperature of which is lower than that of LPG. Consequently, it is possible to reduce the pressure in the LPG bombe, making it possible to easily refill the LPG bombe with LPG.

In embodiments, referring to FIGS. 1 to 11, a bi-fuel vehicle includes a bi-fuel engine 30, a gasoline tank 10, an LPG tank 20 and a heat exchanger 40 installed in the LPG tank 20. The bi-fuel engine 30 is capable of runs run on two or more fuels, which are gasoline fuel and LPG (liquefied propane gas or liquefied petroleum gas). The gasoline tank 10 contains gasoline and is connected to the engine 30 via a gasoline supply line 11, while the LPG tank 20 contains LPG and is connected to the engine 30 via an LPG supply line 21. The heat exchanger 40 is disposed in the LPG tank, and includes a container connected to the gasoline tank 10 via a gasoline branch line 13 which is branched from the gasoline supply line 11. The container is further connected to the LPG tank 20 via an LPG branch line 26 which is branched from the LPG supply line 21. The heat exchanger 40 includes a check valve 46.

The bi-fuel vehicle further includes a gasoline valve 14 and an LPG valve 28. The gasoline valve 14 is disposed on the gasoline branch line 13 and controls the flow of the gasoline fuel toward the container of the heat exchanger 40. The LPG valve 28 is disposed on the LPG branch line 26 and controls the flow of the LPG toward the container of the heat exchanger 40. The vehicle further includes a controller including one or more processors.

The controller 50 controls the gasoline valve 14 and the LPG valve 28 based on the pressure of the LPG tank 20. Under the control by the controller 50, the gasoline valve 14 is opened while the LPG valve 28 is closed such that part of the gasoline fuel is transmitted to the container of the heat exchanger 40 while supplying the gasoline fuel to the engine 30 for combustion. Subsequently, the gasoline valve 14 and the LPG valve 28 are closed such that either gasoline fuel or LPG is not transmitted to the container for a time period for letting the gasoline fuel contained in the container of the container 40 to heat-exchange with the LPG contained in the LPG tank 20. Subsequently, when the LPG is supplied to the engine 30 for combustion, the LPG valve 28 is opened while the gasoline valve 14 is closed such that part of the LPG is transmitted to the container of the heat exchanger in which the part of the LPG is mixed with the gasoline contained in the container. Supplying the LPG increases the pressure in the container of the heat exchanger 40 thereby causing the mixture of the gasoline and the LPG in the container of the heat exchanger 40 to be released to the LPG tank 20 through the check valve 46. In embodiments, the gasoline fuel is not supplied to the heat exchanger 40 while the LPG is supplied to the heat exchanger 40. Further, the LPG is not supplied to the heat exchanger 40 while the gasoline fuel is supplied to the heat exchanger 40.

As is apparent from the above description, embodiments of the present invention have the following effects.

First, it is possible to cool the interior of the LPG bombe, and at the same time to lower the pressure in the LPG bombe by supplying some gasoline from the gasoline tank into the auxiliary chamber in the LPG bombe using the fact that the temperature of gasoline in the gasoline tank is lower than the temperature of LPG in the LPG bombe.

Second, it is possible to lower the vapor pressure of LPG using the cooling effect of gasoline by mixing some gasoline supplied to the auxiliary chamber in the LPG bombe with LPG. As a result, it is possible to further reduce the pressure in the LPG bombe.

In conclusion, in the case in which the external temperature is very high, e.g. in the hot season, the interior of the LPG bombe is cooled and the vapor pressure of LPG is lowered using gasoline, the temperature of which is lower than that of LPG. Consequently, it is possible to reduce the pressure in the LPG bombe, making it possible to easily refill the LPG bombe with LPG.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. An LPG bombe cooling system of a bi-fuel vehicle comprising:
   an auxiliary chamber mounted in an LPG bombe of the bi-fuel vehicle;
   a first fuel branch line diverging from a gasoline supply line which connects a gasoline tank and an engine, the first fuel branch line connected to the auxiliary chamber;
   a second fuel branch line diverging from an LPG supply line which connects an LPI pump mounted in the LPG bombe and the engine, the second fuel branch line connected to the auxiliary chamber;
   a first valve mounted in the first fuel branch line;
   a second valve mounted in the second fuel branch line; and
   a controller configured to control the first and second valves such that the first valve and the second valve are opened or closed based on a pressure in the LPG bombe.

2. The LPG bombe cooling system of claim 1, wherein the auxiliary chamber includes:
   a flange portion seated on a mounting hole formed in the LPG bombe;
   a heat exchange chamber extending from the flange portion into the LPG bombe; and
   a sealing cover attached to the mounting hole in the LPG bombe on which the flange portion is seated.

3. The LPG bombe cooling system of claim 2, wherein the heat exchange chamber is provided with a check valve for allowing LPG to flow from the heat exchange chamber into the LPG bombe at a distal end portion of the heat exchange chamber.

4. The LPG bombe cooling system of claim 2, wherein the auxiliary chamber is made of an aluminum material having a high heat transfer rate.

5. The LPG bombe cooling system of claim 1, wherein the auxiliary chamber is provided with a jet nozzle for spraying gasoline into a heat exchange chamber at an inlet of the auxiliary chamber.

6. The LPG bombe cooling system of claim 1, wherein the first fuel branch line is provided with a flow meter for measuring an amount of gasoline supplied to the auxiliary chamber at a point of the first fuel branch line between the first valve and the auxiliary chamber.

7. The LPG bombe cooling system of claim 1, wherein the LPG bombe has therein a partition wall for partitioning an interior of the LPG bombe into a space in which the auxiliary chamber is disposed and a space in which the LPI pump is disposed and for preventing gasoline from being directly supplied to the LPI pump.

8. The LPG bombe cooling system of claim 1, wherein the controller controls an amount of time for which the first valve is open based on a remaining LPG amount measurement signal from an LPG gauge mounted in the LPG bombe in order to determine an amount of gasoline that is supplied to the auxiliary chamber.

9. The LPG bombe cooling system of claim 1, wherein, when the LPI pump is operated in a state in which the first valve is closed, the controller performs control such that the second valve is open for a predetermined time period, whereby a portion of LPG supplied from the LPG bombe to the engine is supplied to the auxiliary chamber.

10. The LPG bombe cooling system of claim 9, wherein the controller performs control such that the LPI pump is operated at a maximum operating level for a predetermined time period.

11. The LPG bombe cooling system of claim 1, wherein the pressure in the LPG bombe is measured using a pressure sensor of a regulator mounted in an LPG supply line and an LPG return line.

* * * * *